United States Patent [19]

Pastor

[11] 4,158,618

[45] Jun. 19, 1979

[54] ACTINIC-RADIATION CURABLE POLYMERS PREPARED FROM A REACTIVE POLYMER, HALOGENATED CYCLIC ANHYDRIDE AND GLYCIDYL ESTER

[75] Inventor: Stephen D. Pastor, Edison, N.J.

[73] Assignee: National Starch and Chemical Corporation, Bridgewater, N.J.

[21] Appl. No.: 887,760

[22] Filed: Mar. 17, 1978

Related U.S. Application Data

[63] Continuation-in-part of Ser. No. 655,755, Feb. 6, 1976, abandoned.

[51] Int. Cl.$^2$ .................................................. C08F 8/00
[52] U.S. Cl. .............................. 204/159.16; 96/115 R; 204/159.14; 204/159.19; 204/159.22; 260/835; 427/54; 428/413; 428/417; 428/436; 428/480; 428/530; 528/273; 528/297

[58] Field of Search ................. 204/159.22, 159.14, 204/159.15, 159.16, 159.19; 260/75 H, 885; 96/115 R

[56] References Cited

U.S. PATENT DOCUMENTS

| | | | |
|---|---|---|---|
| 3,812,063 | 5/1974 | Kimura et al. | 260/9 |
| 3,840,448 | 10/1974 | Osborn et al. | 204/159.14 |
| 3,878,076 | 4/1975 | Nishikubo et al. | 204/159.15 |
| 3,935,330 | 1/1976 | Smith et al. | 427/41 |
| 3,979,270 | 9/1976 | Trecker et al. | 204/159.14 |

*Primary Examiner*—Richard B. Turer
*Attorney, Agent, or Firm*—Edwin Szala; Ellen T. Dec

[57] ABSTRACT

A novel class of photosensitive polymers are disclosed which are prepared by the reaction, preferably in the presence of a catalyst, of a reactive polymer, a halogenated cyclic anhydride and glycidyl ester of an alpha, beta-unsaturated carboxylic acid. These polymers are capable of undergoing vinyl-type polymerization when exposed to actinic radiation.

10 Claims, No Drawings

ACTINIC-RADIATION CURABLE POLYMERS PREPARED FROM A REACTIVE POLYMER, HALOGENATED CYCLIC ANHYDRIDE AND GLYCIDYL ESTER

This application is a continuation-in-part of our copending U.S. application Ser. No. 655,755 filed Feb. 6, 1976, now abandoned.

BACKGROUND OF THE INVENTION

I. Field of the Invention

This invention is directed to actinic radiation curable polymers. More particularly, this invention is directed to a novel class of photosensitive polymers which are formed by the reaction of certain polymers with halogenated cyclic anhydrides and glycidyl esters of alpha, beta-unsaturated carboxylic acids. The resulting photosensitive polymers are capable of undergoing rapid curing or crosslinking on exposure to actinic radiation and have particular use in the preparation of photosensitive compositions.

II. Brief Description of the Prior Art

It is well known that actinic curable compositions generally comprise a low molecular weight polyunsaturated resin dissolved in a selected combination of vinyl monomers to which a relatively small amount of photoinitiator is added. The resultant composition is then coated on a substrate and cured by exposure to actinic radiation, thereby forming a high molecular weight polymer on the substrate.

It has previously been found desirable, for fast and efficient curing of such polymers, to include within the system relatively large amounts of the photoinitiating component. Such levels of photoinitiator cannot, however, be used with certain systems since these high levels of photoinitiator will not dissolve or mix homogeneously with the remainder of the system. Even in systems wherein these larger amounts of photoinitiators are compatible, most of the photoinitiator will remain chemically unbonded in the final cured composition producing deleterious effects on the properties of these cured materials. An additional drawback to the use of high levels of photoinitiators is the possibility of the occurrence of side reactions by the unbonded portions of the photoinitiators on exposure to actinic radiation. Furthermore, in systems which require additional reagents, such as synergists to effectively initiate polymerization, the presence of the necessary correspondingly high concentrations of these synergistic chemicals would also result in a reduction of the desired properties of the cured compositions. Still an additional drawback to the addition of such post-added synergists is the fact that even after curing the synergists may not be permanently bonded within the system and may leach out and cause undesirable contamination in the final composition.

Recently, monomeric photoinitiators have been proposed wherein the photoinitiating component becomes permanently incorporated into the backbone of the final cured polymer thereby avoiding many of the drawbacks discussed above. In these cases, the monomeric photoinitiator is randomly bonded with specific copolymerizable monomeric materials and the resultant relatively low molecular weight prepolymeric compound is cured by exposure to actinic radiation. Alternatively, these monomeric or prepolymeric photoinitiators may be chemically bonded by conventional polymerization techniques to other monomeric or polymeric compositions prior to exposure to radiation. In either of these embodiments, however, the practitioner's choice of monomers has been limited mainly to polyfunctional acrylate and methacrylate based monomers since most monomers, particularly those monofunctional acrylates and methacrylates which would result in a flexible soft coating, are slow to cure, have undesirable odors and/or are toxic in their uncured state. Thus, the final properties in the cured compositions have been limited primarily to rigid, non-flexible coatings or shaped articles.

Therefore, in order to produce photosensitive polymeric compositions, particularly those resulting in flexible or soft cured coatings or articles, the practitioner has been restricted to post-adding photoinitiators to the polymer, often in conjunction with synergistic chemicals. The problems inherent in this method are comparable to those encountered when post-adding photoinitiators to monomers discussed above.

It is an object of the present invention to provide high molecular weight photosensitive polymers capable of undergoing rapid crosslinking and curing when exposed to actinic radiation.

It is a further object of the invention to provide photosensitive polymers which contain a wide range of polymeric backbone components thereby enabling formation of a wide variety of properties in the final cured material.

It is also an object of the invention to provide photosensitive polymers which will cure rapidly when exposed to actinic radiation without the necessity for or the addition of post-added and externally unbonded photoinitiator and/or synergistic chemical.

It is an additional object of the invention to provide a novel class of photosensitive polymers which are relatively insensitive to the effects of atmospheric oxygen and which will cure rapidly and efficiently when exposed to actinic radiation.

These and other objects will be apparent from the description which follows.

SUMMARY OF THE INVENTION

The photosensitive polymers of the present invention are characterized by the formula:

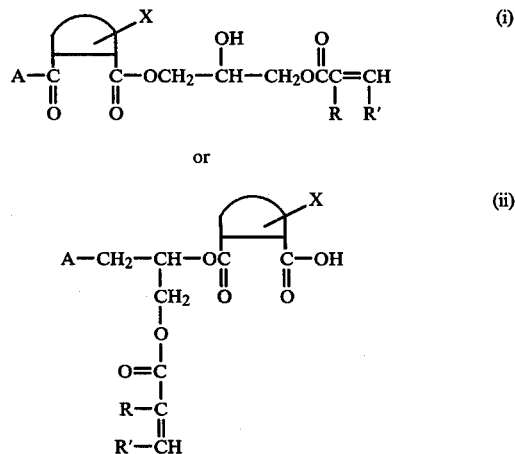

where A is a residue of a polymer having a molecular weight of about 500 to 5,000 and containing at least one reactive terminal hydroxyl or carboxyl group; X is at least one halogen selected from the group consisting of chlorine, bromine and iodine; and R and R' are independently methyl or hydrogen. The exact structure, (i) or (ii), will be dependent upon the reactive terminal group of the starting polymer. Thus, if the terminal group is a hydroxyl, structure (i) will result while if the terminal group is carboxyl, compounds of structure (ii) will be produced. The expression "terminal hydroxyl or carboxyl group" signifies a group which is not bound towards the center of the polymer molecule, but rather the hydroxyl or carboxyl group is either isolated at one end of the polymer or at least at the end of a substituent branch if it is incorporated into the large polymeric molecule. It is to be understood that the polymer component "A" will generally be difunctional and often will contain even more than two of the reactive groups which may enter into the polymerization reaction described hereinbelow. Thus, although the general representation shown above exemplifies a polymer containing only one reactive site, multifunctional and consequently multi-reacted polymers are also included within the scope of the invention.

The photosensitive polymers are prepared by the reaction of the polymer with a halogenated cyclic anhydride and a glycidyl ester of an alpha, beta-unsaturated carboxylic acid. The proportions of the reactants employed will vary depending upon the number of reactive sites available on the polymer and the degree of substitution required. Generally, the halogenated cyclic anhydride and the glycidyl ester are used in approximately equimolar amounts and at least one mole of each is employed per mole of polymer.

Thus, in accordance with the present invention, it is possible to incorporate within a photosensitive material a wide range of polymeric constituents which enables the production of photosensitive materials containing relatively high Mc values (i.e. the molecular weight of the portion of the compound between crosslinks). In contrast, the photosensitive materials of the prior art are characterized by relatively low Mc values resulting in the production of only hard, brittle non-flexible films and shaped objects.

The resulting photosensitive polymers may be used alone or in combination with selected monomers or polymers and when subjected to actinic radiation will cure or further polymerize, in the absence of additional externally added photoinitiators or synergists, to form a smooth, glossy surface, the properties of which will vary depending upon the base polymer employed.

DESCRIPTION OF THE PREFERRED EMBODIMENTS

The photosensitive polymers of the invention are prepared by the reaction of polymeric materials containing terminal reactive hydrogen atoms with cyclic halogenated anhydrides and the glycidyl esters of alpha, beta-unsaturated carboxylic acids, preferably in the presence of a catalyst, at a temperature which will be high enough to result in an adequate reaction rate for a period of time sufficient to insure substantially complete reaction.

The polymeric materials useful herein are those containing reactive hydroxyl or carboxyl end groups having molecular weights of about 500 to 5,000, preferably 1,000 to 2,000. Polymers having molecular weights greater than about 5,000 may be employed but since these polymers are generally solids, it will be more difficult to obtain the desired reaction since the use of extremely high temperatures, solvents and longer reaction periods will be required. Similarly, polymers containing reactive hydrogens other than those derived from hydroxyl or carboxyl groups may be employed but the use thereof would be restricted due to lack of commercial availability or to the nature of the polymers which may require melting at extremely high temperatures and/or careful control of reaction conditions in order to avoid undesirable side reactions.

Among the useful polymers are included polyethers such as the polyalkylene glycols including polyethylene oxide, polypropylene oxide and polybutylene oxide as well as such hydroxyl substituted ethers as bisphenol A-epichlorohydrin, etc.; polyesters including poly(diethylene glycol adipate), poly(diethylene glycol succinate), poly(1,6-hexanediol isophthalate) poly(diethylene glycol phthalate), poly(1,6-hexanediol adipate), poly(ethylene glycol adipate), poly(triethyleneglycol maleate) and poly(triethyleneglycol succinate). Also included within the scope of the invention are vinyl polymers such as hydroxyl terminated poly(butadiene), and the copolymers of hydroxyalkyl acrylates; hydroxy terminated polycarbonates such as the reaction product of phosgene and ethylene glycol. Carboxylic acid type polymers useful include the vinyl types such as carboxyl terminated poly(butadienes), carboxyl terminated poly(styrenes), carboxyl terminated butadiene/acrylonitrile, copolymers of acrylic acid, methacrylic acid, crotonic acid, etc. as well as the carboxyl terminated polyesters such as carboxyl terminated poly(ethylene glycol adipate), etc. It will be recognized by those skilled in the art that the copolymers mentioned previously include copolymers of the required hydroxyl and carboxyl terminated polymers with any other ethylenically unsaturated components copolymerizable therewith. The copolymerizable components may be present in any proportions provided at least one reactive carboxyl or hydroxyl functionality is present in the final copolymer.

Cyclic halogenated anhydrides useful herein are those aromatic anhydrides which contain at least one halogenated substituent or the alicyclic anhydrides containing at least one dihalogenated carbon atom or an allylic halogen. The cyclic halogenated anhydrides employed are those having from 5 to 15 carbon atoms and being devoid of groups which will inhibit free-radical polymerization. Examples of specific anhydrides include tetrachlorophthalic anhydride, tetrabromophthalic anhydride, tetraiodophthalic anhydride, and 1,4,5,6,7,7-hexachloro-5-norbornene-2,3-dicarboxylic anhydride.

The glycidyl esters of alpha, beta-unsaturated carboxylic acids useful herein are represented by the formula:

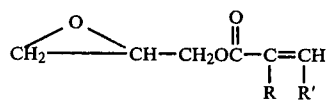

where R and R' are independently methyl or hydrogen. Suitable esters include 2,3-epoxypropyl acrylate, 2,3-epoxypropyl methacrylate and 2,3-epoxypropyl crotonate.

The proportions of reactants employed in producing the photosensitive polymers is not critical. Ordinarily, however, a molar ratio of approximately one mole of halogenated cyclic anhydride and one mole of glycidyl ester of alpha, beta-unsaturated carboxylic acid per mole equivalent of reactive groups on the polymer is used to obtain maximum conversion. It will be understood by those skilled in the art that, depending upon the reaction efficiency of the individual components, it may be desirable to employ either reactant in an amount of up to about 20% in excess of the stoichiometric amount in order to obtain a more fully converted polymeric species.

It will also be recognized to those skilled in the art there may be present in the polymer other reactive hydrogen atoms in addition to the terminal groups. The number and relative reactivity of these reactive hydrogens will vary depending on the specific composition. Thus, the mole ratio of halogenated cyclic anhydride and glycidyl ester of alpha, beta-unsaturated carboxylic acid can be adjusted to achieve a partial or essentially complete conversion. Generally complete conversion leads to faster cure rates on exposure to actinic radiation.

It is preferred that the reaction to produce the novel polymers be conducted in the presence of about 0.1 to 10%, based on the total weight of the components, of a reaction catalyst. The catalyst employed may be chosen from among any member of the group consisting of alkali metal hydroxides, such as sodium hydroxide or potassium hydroxide; the salts of alkali metals such as sodium acetate or lithium acetate and the quaternary ammonium halides, such as tetramethylammonium chloride or tetrabutylammonium iodide or benzyl trimethylammonium chloride. The particular order of addition of the reactants is generally not critical.

It is a matter of ordinary preparative experience on the part of the practitioner to determine the precise combination of time and temperature which will be best suited for the synthesis of the specific polymer. Ordinarily, temperatures within the range of 60° to 120° C., preferably 80° to 100° C., will be employed and the reaction will be carried out for a period of about 2 to 20 hours, depending on the temperature and particular components employed. The reaction is terminated when conversion of the anhydride reactant is found to be substantially complete as may be determined, for example, with hydroxyl terminated polymers when titration, where applicable, of an aliquot has indicated an acid number of 0 to 12, preferably 0 to 3.

Those skilled in the art will recognize that in employing polymers terminated with acidic end groups (e.g. carboxyl), reaction of the epoxide precedes the reaction with the halogenated cyclic anhydride resulting in a carboxylic terminated photosensitive polymer. If this occurs, titration to a calculated acid number greater than zero will result in production of the desired compound.

Upon completion of the reaction and subsequent cooling of the reaction vessel to room temperature, the resulting products will usually be in the form of either crystalline solids or viscous oils. For most purposes, including any subsequent photoinitiated curing reactions, this crude polymer can then be used without further purification. However, when desired, the relatively small amount of unreacted starting materials may be removed. Separation techniques, such as chromatographic separation, or aqueous alkali or organic solvent extraction procedures may be used where so desired by the practitioner.

Additionally, it is possible to prepare the novel photosensitive polymers of the invention by reaction in an aprotic solvent medium. This method is most often employed when the polymer is a solid with a relatively low melt viscosity. Under these conditions, the individual components may be dissolved in an aprotic solvent such as acetone, toluene, methyl ethyl ketone, tetrahydrofuran, dimethylformamide or dimethylsulfoxide. The resulting product is recovered by removing the solvent whereupon the crude product may, if desired, be purified by means of the above noted techniques. The use of such solvents is not preferred, however, since the reaction rate is substantially reduced.

If desired, non-monomeric functional additives may be blended with the curable polymeric compositions resulting from the above described reaction in order to modify the properties of the final cured composition. Among the additives which may be included are fillers such as finely ground polymer resins; polymerization stabilizers such as p-methoxyphenol and the like; pigments such as titanium dioxide, barium sulfate and the like; and ultraviolet light transparent dyes such as Brilliant Violet B, Fast Red 8BLX; plasticizers, etc.

In addition to the functional additives mentioned above, the resultant curable polymer compositions of the present invention may also be blended with up to about 70%, preferably up to about 50%, by weight of the total composition, of monomeric units derived from at least one copolymerizable diluent vinyl monomer. In this embodiment, the composition, upon curing on exposure to actinic radiation, will result in polymerization of the monomeric materials into the final polymeric system. Suitable mono- or polyfunctional unsaturated comonomers include (i) acrylic and methacrylic acids; (ii) the alkyl and substituted alkyl esters of said acids wherein the alkyl groups contain from 1 to 20, preferably 2 to 12 carbon atoms, e.g. ethyl acrylate, ethyl methacrylate, propyl acrylate, propyl methacrylate, 2-ethyl hexyl acrylate, dodecyl acrylate, etc.; (iii) the hydroxyalkyl esters of said acids, wherein the alkyl chain contains from 2 to 20, preferably 2 to 6, carbon atoms, e.g. 2-hydroxyethyl acrylate, hydroxypropyl acrylate, hydroxybutyl acrylate, hydroxypentyl acrylate, hydroxyhexyl acrylate, hydroxyheptyl acrylate, hydroxyoctyl acrylate, etc. and the corresponding hydroxyalkyl methacrylates; (iv) the cycloalkyl ester derivatives of said acids, wherein the cycloalkyl groups contain from 5 to 10 carbon atoms, e.g. cyclohexyl acrylate or cyclohexyl methacrylate; (v) the glycidyl esters of said acids; (vi) the mono-, di-, tri- and tetraethylene glycol esters and diesters of said acids, e.g. ethylene glycol diacrylate, diethylene glycol diacrylate, triethylene glycol diacrylate, tetraethylene glycol diacrylate, ethylene glycol methacrylate, ethylene glycol dimethacrylate etc.; (vii) the polyhydric alcohol ester derivatives of said acids, e.g. the pentaerythritol tri- and tetraacrylates and the corresponding methacrylates; and (viii) the alkanediol ($C_{2-8}$) ester derivatives of said acids, e.g. 1,6-hexanediol diacrylate.

The novel photosensitive polymers at the temperatures at which they are prepared or at ambient temperatures may be applied to a substrate by means of any conventional coating technique in order to produce the desired overcoating, protective coating, printing or decorative coating or the like. Thus, the curable polymers may be applied by use of any mechanical coating process such as air knife, trailing blade, knife coater, reverse roll or gravure coating techniques. Since the adaptability of a suitable method of coating, notwithstanding the viscosity of the coating composition, will depend to some extent on the shape or form of the substrate, selection of a particular technique is left to the practitioner.

It may also be desirable to adjust the viscosity of a stored composition in order to facilitate coating. The particular method selected for this purpose and the feasibility thereof will depend considerably on the rheological properties of the composition. Similarly, the coating weights will depend on the particular method of application and the specific end use desired.

The photocurable polymers may be coated onto virtually unlimited variety of substrates including paper, cloth, paperboard, wood, metal sheets and foils, glass, fiberglass, foamed plastic, rubber, cellophane, and plastic films and sheets such as those derived from polyethylene terephthalate, polystyrene, rubber hydrochloride, polyvinyl chloride, polyvinylidene chloride and any substrate where there is sufficient adhesion to the coated film. Moreover, these novel photocurable polymers may be used as adhesives to laminate two substrates where at least one substrate can be penetrated by actinic radiation.

Subsequent to its application, regardless of the ultimate intended use, the polymeric composition in its applied form, e.g. as a film, is polymerized (cured) upon exposure to actinic radiation having a wavelength of 2000 to 5000 Å for a period of time sufficient to accomplish the desired amount of polymerization. Ordinarily, a period of 1/10 to 2 seconds at a wavelength of 2500 to 4000 Å is sufficient to insure adequate curing of most films and coatings. Using laboratory procedures wherein lower intensity lamps may be employed, the curing times will be proportionately longer.

This polymerization or curing operation may be conducted while the polymeric material is still in the initial physical form resulting from its preparation. However, it is more convenient and therefore preferred to effect the polymerization reaction after the composition has been formed into a shaped article, e.g. a film, coating or molded structure. This latter sequence is particularly preferred when the coating is intended for a non-adhesive use, e.g. overcoating or protective coating, etc. It is noted that since these uncured photocurable coating compositions display appreciable tack and cohesive characteristics, it is preferred that a removable cover sheet be utilized whenever it is elected to delay curing for a considerable period.

The following examples will further illustrate the various embodiments of the present invention. In these examples, benzyl triethyl ammonium chloride was used as a reaction catalyst and p-methoxyphenol as a free radical stabilizer in the preparation of the photosensitive polymers. The equivalent molecular weights of the polymers are determined by the hydroxyl number or acid number for hydroxyl and carboxyl terminated polymers respectively. All quantities are given in terms of grams unless otherwise specified.

EXAMPLE 1

This example illustrates the preparation of a photosensitive polymer formed by the reaction of tetrachlorophthalic anhydride, glycidyl methacrylate and poly(diethylene glycol adipate).

A one liter flask equipped with a reflux condenser topped by a drying tube, mechanical agitator, thermometer and water bath was charged with the following:

| Ingredient | Amount (gms) |
| --- | --- |
| Poly(diethylene glycol adipate) (OH #112.1) | 200 |
| Tetrachlorophthalic anhydride | 115 |
| 2,3-Epoxypropyl methacrylate | 56 |
| p-Methoxyphenol | 0.4 |
| Benzyl triethyl ammonium chloride | 2 |

The ingredients were continuously stirred, and the temperature elevated and maintained at 90° C. until reaction was complete, (about 6 hours) as indicated by an acid number of approximately 0.1–3 (defined as the number of milligrams of KOH required to neutralize one gram of resultant polymer). The prepared composition was discharged from the flask, cooled and tested for curability in the following manner.

Several samples of Mylar (polyethylene terephthalate sold by DuPont) (4"×4") were coated with the photosensitive polymer to a thickness of 0.5 mil. with a glass rod. The coated samples were exposed in air to a 200 watt/in. ultraviolet light by means of six passes at 300 feet/min. on a conveyorized sampling system. The coating dried to a smooth, glossy, flexible film. The film remained flexible and, despite repeated bending, showed no signs of cracking or peeling from the Mylar surface.

EXAMPLE 2

This example illustrates the preparation of a rigid film using polyethylene glycol (average molecular weight 570) as the base polymer.

The procedure of Example 1 was repeated using the following components:

| Ingredient | Amount (grams) |
| --- | --- |
| Polyethylene glycol (Average OH #197) | 300.0 |
| Tetrachlorophthalic anhydride | 285.9 |
| 2,3-Epoxypropyl methacrylate | 142.0 |
| p-Methoxyphenol | 0.7 |
| Benzyl triethyl ammonium chloride | 3.5 |

The resultant polymer was coated on glass slides to a thickness of 0.5 mil. with a glass rod. The coated slides were exposed in air for 50 seconds to a 60 watt/in. ultraviolet lamp. The coating dried to a hard, glossy film which adhered to the glass support.

EXAMPLES 3–18

In a manner similar to that described in Examples 1 and 2, the components listed in Table I were combined in varying proportions to produce a series of photosensitive polymers. The amounts of the components are given in grams.

When the prepared photosensitive polymers were exposed to ultraviolet radiation, all the polymers cured producing films ranging from hard brittle films to soft flexible films, depending on the choice of starting materials.

EXAMPLE 19

This example illustrates the use of the photosensitive polymers of the present invention in combination with vinyl-type monomers.

A coating mixture was prepared by of 6.5 grams of the photosensitive polymer of Example 2 together with 4.0 grams of 2-hydroxyethyl acrylate. The resultant composition was coated on a glass slide to a film thickness of 0.5 mil.

a coated substrate with a wire wound rod and exposed to a commercial 200 watt/in ultraviolet light by means Table I

| Ingredient | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|
| Tetrachlorophthalic Anhydride | 285.9 | 285.9 | | | 39.7 | 142.5 | | 571 | 115 | 115 | | 53 | 53 | 285.9 | 57 | 100 |
| Tetrabromophthalic Anhydride | | | 463.7 | | | | 185 | | | | | | | | | |
| 1,4,5,6,7,7-Hexachloro-5-norbornene-2,3-dicarboxylic anhydride | | | | 370.1 | | | | | | | 68.5 | | | | | |
| 2,3-Epoxypropyl acrylate | 128 | | | | 17.8 | | | | 51.2 | | | | 23.7 | | | |
| 2,3-Epoxypropyl methacrylate | | | 142 | 142 | | 71 | 56 | 284 | | 56 | 26.2 | 26.2 | | 142.2 | 28 | 57 |
| 2-3-Epoxypropyl crotonate | | 142 | | | | | | | | | | | | | | |
| Polyethylene glycol OH #197 | 300 | 300 | 300 | 300 | | 300 | | | | | | | | | | |
| Polypropylene glycol (Ave. Mol. Wt. 4300) OH #26.0 | | | | | 300 | | | | | | | | | | | |
| Poly(diethylene glycol adipate) OH #112.0 | | | | | | | 200 | | 200 | 200 | | | | | | |
| Poly(1,6-hexane diol isophthalate) OH #51.7 | | | | | | | | | | | 200 | 200 | 200 | | | |
| Hydroxyl terminated polybutadiene (M.W. 1000–1400) OH #98.1 | | | | | | | | 1500 | | | | | | | | |
| Poly(1,6-hexanediol succinate) (Acid No. 112) | | | | | | | | | | | | | | 500 | | |
| Carboxyl terminated butadiene 5% hydroxyl No. 49) | | | | | | | | | | | | | | | 229 | |
| Copolymer of 95% butylacrylate and 5% hydroxyl ethyl acrylate | | | | | | | | | | | | | | | | 1000 |
| Benzyl triethyl ammonium chloride | 3.5 | 3.5 | 3.5 | 3.5 | 1.5 | 3.5 | 3 | 10 | 2 | 2 | 1.5 | 1.5 | 1.5 | 4.5 | 1.5 | 5 |
| p-Methoxyphenol | 0.7 | 0.7 | 0.7 | 0.7 | 0.3 | 0.7 | 0.5 | 2 | 0.4 | 0.4 | 0.6 | 0.6 | 0.6 | 0.9 | 0.3 | 1 |
| Toluene | | | | | | | | | | | | | | | | 1000 |

On exposure of the coated slide to ultraviolet radiation (60 watt/in) for 50 seconds, the coating cured to a hard, glossy film.

EXAMPLES 20–32

In a similar manner to that described in Example 19 the photosensitive polymers of Examples 2, 9 and 12 were employed as mixtures with a variety of vinyl monomers. The amounts of the components employed are shown in grams in Table II.

When exposed to ultraviolet radiation as described in Example 19 the coating composition cured with the properties of the final cured coating dependent upon the choice of photosensitive polymer and monomer.

of a conveyorized sampling system. After an exposure period of one-half second the system provided a hard flexible finish with high gloss.

EXAMPLES 34–46

Similarly the photosensitive formulations of Examples 20–32 were coated on paper as described in Example 33. The properties of the final cured films were dependent upon the particular polymers and monomers employed.

It is understood that variations in proportions, procedures and materials may be made without departing from the scope and spirit of the invention as defined by the following claims.

Table II

| Ingredient | 20 | 21 | 22 | 23 | 24 | 25 | 26 | 27 | 28 | 29 | 30 | 31 | 32 |
|---|---|---|---|---|---|---|---|---|---|---|---|---|---|
| Photosensitive Polymers of Example 2 | 6.5 | 8 | 6 | 6.5 | 6 | 14 | 7 | 6 | | | | | |
| Photosensitive Polymers of Example 9 | | | | | | | | | | | 3 | 1 | 2 |
| Photosensitive Polymers of Example 10 | | | | | | | | | 1 | 2 | | | 2 |
| 2-Hydroxyethyl Acrylate | 4 | 5 | 5 | | | 7 | 5 | 4 | 1 | 2 | 3 | 1 | 4.5 |
| Trimethylolpropane Triacrylate | | 5 | | | | 5 | | | | 2 | | 1 | |
| 2-Ethylhexyl Acrylate | | | | 2 | | | 5 | | | | | | |
| Cyclohexyl Methoacrylate | | | | | 2 | | | | | | | | |
| Diethylene Glycol Diacrylate | | | | | 4 | | | | | | | | |
| Acrylic Acid | | | | | | | 0.5 | | | | | | |
| Diethylene Glycol Dimethacrylate | | | | | | | | 1 | | | | | |

EXAMPLE 33

This example illustrates the use of polymer of Example 7 as a gloss overcoat on paper. For this purpose a film of polymer as prepared in Example 7 was cast onto

I claim:

1. A cured composition of matter prepared by exposing to actinic radiation of wavelength in the range of 2500 to 4000 Å without the addition of externally added photoinitiator a composition which is insensitive to the effects of atmospheric oxygen of the formula:

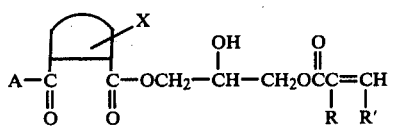 (i)

or

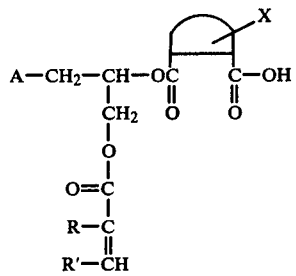 (ii)

where A is a residue of a polymer having a molecular weight of about 500 to 5,000 and containing at least one reactive terminal hydroxyl or carboxyl group; X is at least one halogen selected from the group consisting of chlorine, bromine and iodine; and R and R' are independently methyl or hydrogen.

2. The cured composition of claim 1 wherein X is chlorine or bromine.

3. The cured composition of claim 1 wherein R and R' are hydrogen.

4. The cured composition of claim 1 wherein A is selected from the group consisting of polyethylene glycol, polypropylene glycol, poly(diethylene glycol adipate) and poly(1,6-hexanediol isophthalate).

5. A coated article comprising a substrate coated with a cured composition of claim 1.

6. A cured composition of matter prepared by exposing to actinic radiation of wavelength in the range of 2000 to 5000 Å without the addition of externally added photoinitiator a composition of the formula:

(a) 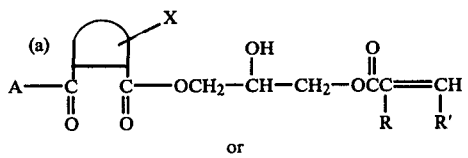 (i)

or

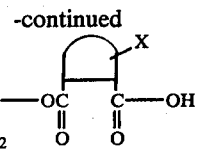 (ii)

where A is a residue of a polymer having a molecular weight of about 500 to 5,000 and containing at least one reactive terminal hydroxyl or carboxyl group; X is at least one halogen selected from the group consisting of chlorine, bromine and iodine; and R and R' are independently methyl or hydrogen, and (b) at least one vinyl monomer in an amount up to about 70% by weight of the total composition.

7. The cured composition of claim 6 wherein the vinyl monomer is selected from the class consisting of
(i) acrylic and methacrylic acid;
(ii) the alkyl and substituted alkyl esters of acrylic and methacrylic acid wherein the alkyl group contains from 1 to 20 carbon atoms;
(iii) the hydroxyalkyl esters of acrylic and methacrylic acid wherein the alkyl group contains from 2 to 20 carbon atoms;
(iv) the cycloalkyl ester derivatives of acrylic and methacrylic acid wherein the cycloalkyl group contains from 5 to 10 carbon atoms,
(v) the glycidyl esters of acrylic and methacrylic acid;
(vi) the mono-, di-, tri- and tetraethylene glycol esters and diesters of acrylic and methacrylic acid;
(vii) The polyhydric alcohol ester derivatives of acrylic and methacrylic acid; and
(viii) the alkanediol ($C_{2-8}$) ester derivatives of acrylic and methacrylic acid.

8. A coated article comprising a substrate coated with a cured composition of claim 6.

9. The cured composition of claim 6 wherein the vinyl monomer is present in an amount up to about 50% of the total composition.

10. The cured composition of claim 1 wherein the curing is accomplished by exposing the uncured composition to actinic radiation with a 200 watt/inch lamp for 0.1 to 2 seconds.

* * * * *